CHARLES A. ROSEN
GEORGE E. FORSEN
INVENTORS

BY Lyon & Lyon
ATTORNEYS

ANALOG STORAGE DEVICE

Filed Dec. 31, 1962

3 Sheets-Sheet 2

CHARLES A. ROSEN
GEORGE E. FORSEN
INVENTORS

BY Lyon & Lyon

ATTORNEYS

CHARLES A. ROSEN
GEORGE E. FORSEN
INVENTORS

BY [signature]

ATTORNEYS

United States Patent Office 3,328,778

Patented June 27, 1967

3,328,778

ANALOG STORAGE DEVICE

Charles A. Rosen, Menlo Park, and George E. Forsen, Palo Alto, Calif., assignors to Stanford Research Institute, Menlo Park, Calif., a corporation of California Filed Dec. 31, 1962, Ser. No. 248,761
6 Claims. (Cl. 340—174)

This invention relates to analog storage systems and more particularly to improvements therein.

An object of this invention is the provision of a novel and improved analog storage system.

Yet another object of this invention is the provision of a random access analog storage system.

Still another object of the present invention is the provision of an analog storage system with non-destructive readout features.

A further object of the present invention is the provision of a unique analog storage system.

These and other objects of this invention may be achieved in an arrangement wherein a plurality of toroidal magnetic ferrite cores are mounted at spaced intervals along a rod in a manner so that the application of a compressional force at a desired frequency to one end of the rod causes a compressional wave to travel down the rod. This applies radial forces to the magnetic cores mounted therealong. Means are provided for increasing or decreasing the magnetic flux content of each core in increments by a circuit arrangement to be described subsequently herein. Each one of these cores has a readout winding inductively coupled thereto. Magnetic ferrite cores have magnetostrictive properties. The vibratory compressional wave applied to one end of the rod causes sufficient strain of the ferrite cores to occur whereby a voltage is induced in the readout winding coupled to the core. The amplitude of the voltage is determined by the net amount of magnetic flux stored in that core. Furthermore, the amount of magnetic flux stored in the core remains unaffected by this readout process, and therefore the readout is non-destructive.

In order to increment or decrement the amount of flux in a core, there is provided, for each core, another magnetic core, which may be termed a bucket core. Provision is made for driving a bucket core from one to the other of its two states of magnetic remanence. As a result of such a drive, a fixed voltage is induced in a readout coil which couples a bucket core to its associated storage core. The polarity of this voltage is determined by the direction of the drive applied to the bucket core. The polarity of this voltage determines whether or not flux is added to or subtracted from the flux content of the storage core.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
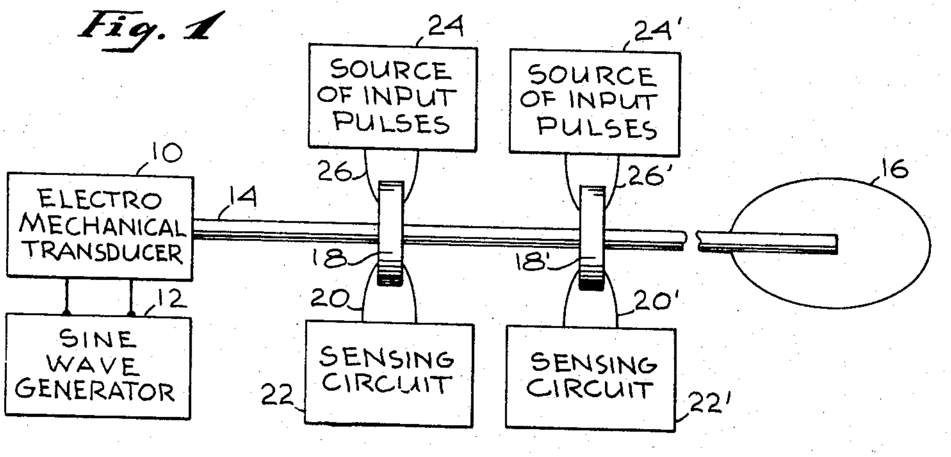
FIGURE 1 is a simplified schematic drawing of an embodiment of the invention.

Referring now to FIGURE 1 there may be seen a block diagram of a simplified arrangement of this invention. An electro-mechanical transducer 10 is driven from a sine wave generator 12 at a frequency which may be, for example, on the order of several hundred kilocycles per second. The electro-mechanical transducer 10 is attached to one end of a mechanical delay line structure 14 which may be, for example, a metal rod. The other end of the mechanical delay line structure is coupled to a lossy termination 16. The electro-mechanical transducer, when excited by the sine wave generator, produces a longitudinal compressional wave which travels down the delay line 14 and is absorbed by the lossy termination at the far end. Storage units 18, 18' are spaced along the line 14 at multiples of half-wavelength intervals. The storage units may be, for example, magnetostrictive magnetic ferrite toroids.

Each one of these toroids, because of their positioning has radial stress substantially simultaneously applied by the high frequency sinusoidal wave traveling in the delay line. Because the ferrite units are magnetostrictive this results in a change in the magnetic flux which links the readout coils respectively 20, 20', which are coupled on the respective cores 18, 18'. Each one of the readout coils is connected to a sensing circuit 22, 22' whereby the voltage induced in the respective readout coils may be detected.

If the stress wave applied to the cores is sufficiently small the change in flux is elastic, hence non-destructive. The net change is proportional to the net remanent flux linking the readout coils 18, 18'. Thus, the stored value is essentially determined by the state of the remanent magnetization. The state of remanent flux in the cores 18, 18' may be determined by outputs from the respective sources of input pulses respectively 24, 24'. Each one of these sources, when energized, is capable of applying a current pulse of one polarity or of the opposite polarity to an input winding respectively 26, 26', which is inductively coupled to the respective cores 18, 18'. Thereby the amount of the remanent flux in the cores may be determined.

It should be appreciated that the system of FIGURE 1 is an arrangement for storing data in an analog fashion in the toroid cores 18, 18', and for providing non-destructive readout. The stress applied to the ferrite cores is made sufficiently small so that only an elastic flux change occurs whereby the flux content of the cores is left unaffected. This system also has utility as a digital storage and non-destructive readout system, since, if desired binary data may be stored in the cores and the operation for non-destructive readout is identical.

Figure 2:
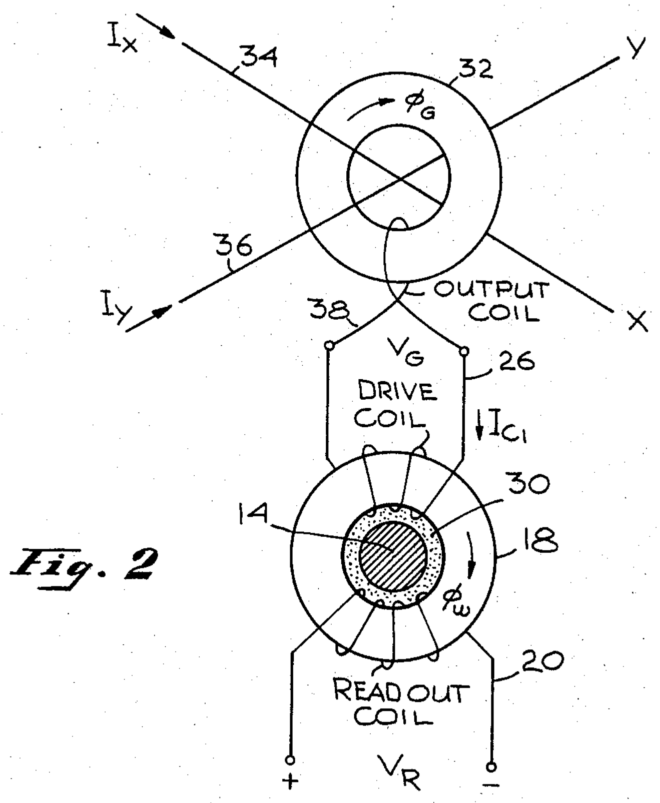
FIGURE 2 is a circuit diagram of a single storage element in accordance with this invention.

In FIGURE 2 there is shown an arrangement for a single analog storage element in accordance with this invention. This drawing shows a storage core 18 with the rod delay line 14 shown in cross-section passing through the center of the core 18. A read-out coil 20 is inductively coupled to the core 18 and is wound thereon, through its central aperture. A read-in coil 26 is inductively coupled to the core 18 and also is wound thereon, through its central aperture. The core 18 is mounted on the delay line 14 by the use of an epoxy material 30 which fixes the core 18 in position on the delay line and also permits sufficient transfer therethrough of the radial forces received from the delay line 14 in response to excitation from the electromechanical transducer 10.

In order to insure that the storage state of the core 18 is altered either positively or negatively by substantially equal flux increments, a second toroidal magnetic core 32 is employed and associated with each one of the analog storage cores. The second core is hereafter designated as a "bucket" core. A bucket core has two drive lines respectively 34, 46 passing therethrough. These are also designated as the $x$ and $y$ coordinate drive lines. The core 32 is driven in response to a coincident current excitation ıplied to the respective $x$ and $y$ drive lines. An excitation ıplied to one or the other of these drive lines alone is sufficient to cause the core 32 to be driven from one to e other of its two states of magnetic remanence. To ose familiar with the magnetic core memory art, the rangement for driving the core 32 will be well known ıce it is employed in the operation of magnetic core emories of the type known as coincident current mag-ıtic core memories.

An output winding 38 is inductively coupled to the ıre 32. The output winding 38 is connected to the input inding 26. The resistance of the coupling windings 26, 3 is selected in accordance with principles well under-ood in the magnetic core coupling art to insure a uni-teral drive of core 18 by core 32 when desired.

The rate at which magnetic material switches with a ınstant magnetomotive force applied to a positively in-easing monotonic function of the magnitude of the agnetomotive force. This function can be approximated ver a range of magnetomotive forces by the relation-ıip $$\frac{1}{\tau_s}=\frac{1}{S_w}H-H'_c$$

here $\tau_s$ is the total switching time, $(1/S_W)$ is the pro-ortionality constant and $H'_c$ is the effective threshold. Infortunately, this threshold is a function of the state f flux in the core. If the core has been given a number f constant current pulses in the same direction, the mount of flux switches per pulse decreases. This results ı a non-linear storage characteristic. Because the effect ; symmetrical with respect to direction, the stored char-cteristic exhibits hysteresis.

Several elaborations have been used to minimize the on-linearities. An obvious method is to use pulses of ufficiently large magnitude, H, to swamp out the varia-ions in effective $H'_c$. However, the magnitude of the cur-ent pulses are restricted in a coincident current scheme uch as the one proposed above. Either pulse of the coin-ident pair must not switch even a small amount of flux. f, for example, one hundred reliable steps are required n the operating range, a maximum of 1/1000 of the total lux can be switched by a single pulse for 10 percent ac-uracy. This places severe requirements on both the 'squareness" of the material and amplitude regulation ıf the current pulses.

Because the interest here is in switching a small, fixed ımount of flux at each coincident pair of pulses and this lux generates a fixed volt-time integral, another approach s to drive the storage cores from a voltage controlled ɔulse source. This source produces a fixed volt-time in-egral, and is of sufficiently low impedance that little ɔack-voltage can be developed by the core switching a lifferent amount than was intended. This technique leads o the use of the bucket core shown in FIGURE 2, which, when switched fully produces at its output winding a voltage-time integral equal to its total flux, for a one turn open circuit output winding. A two turn open circuit, output winding would produce a voltage-time integral equal to twice the total flux the bucket core. This voltage-time integral is impressed on the drive coil of the storage core and is divided by its (larger) number of turns, producing its smaller flux change. If the total flux of both bucket and storage cores are equal in magnitude, the number of steps in the storage unit operating range is equal to the ratio of the number of turns on the storage core to the number of turns on the bucket core, when no losses or elastic flux storage occur in the flux changes. This ratio represents a lower limit. Of course, losses and elastic storage do occur, for example, switching losses in both cores, copper losses in the coils and winding inductances. The switching of flux in the bucket core and the resultant flux change in the storage core is called the flux transfer. The output coil of the bucket core 38 and the connected drive coil 26 of the storage core together constitute a flux transfer winding.

If two consecutive changes of flux in the storage core are desired to be in the same direction, the bucket core must produce an output of the same polarity twice. This requires that the bucket core be reset after the first switching so as to be able to switch again for the second flux transfer. The flux transferred during the first drive or switching can be transferred back during the resetting operation unless a one-way flux transfer technique is used.

Two phenomena are utilized to achieve a one-way transfer of flux in accordance with this invention. One of these has been mentioned i.e. proper selection of the resistance value of the transfer winding and is used in transfers between multi-aperture magnetic core devices. When a magnetic core is driven by a current pulse (or pulse pair) whose magnitude is several times the switching threshold, the core switches several times faster than if a pulse is used whose magnitude is just slightly larger than the switching threshold. The output voltage of the bucket core is thus made several times larger for the faster switching case (larger $d\phi/dt$) than for the slower switching case. If the transfore loop impedance is sufficiently resistive, the transfer loop current will closely resemble the waveshape of the output voltage of the bucket core. No flux will be switched in the storage core if its drive current is below the storage core switching threshold. The right combination of turns, coupling loop resistance, and bucket core drive can achieve reliable one-way flux transfer in the desired direction when switching the bucket core fast in the flux transfer direction and slowly in the reset direction. Thus the technique of using the current threshold and a fixed voltage-time integral is combined to achieve one-way, fixed amount flux transfer. Larger resistance in the transfer loop enhances the one-way flux transfer feature. However, smaller resistance enhances the fixed size flux transfer feature. Fortunately, there is a wide resistance range which is optimum in terms of over-all performance. Here also it is important to use square loop magnetic ferrite material with a well-defined threshold for the storage core. It is also beneficial to be able to increase the ratio of flux transfer pulse size to reset pulse size by increasing the bucket core drive ratio.

If the coincident current scheme shown in FIGURE 2 is used without modification to drive the bucket core, two problems arise. First, the flux-transfer to reset pulse-pair size ratio is limited by the requirement that neither pulse alone of either pulse-pair switch the bucket core. The combined size of the flux transfer pulse-pair must be less than twice as large as the combined size of the reset pulse-pair. Thus the ratio of flux transfer to reset coupling current cannot be larger than two when using a coincident current scheme to drive the bucket core. This offers no advantage over driving the weight cores directly. The second problem is not as serious. This is the requirement of always using a reset pulse-pair, or more correctly, a priming-pulse-pair to insure that a bucket core will always switch in a correct direction prior to the flux transfer pulse-pair. The same logic could be used for generating the priming-pulse-pair as for generating the flux-transfer pulse-pair.

Figures 3, 4:
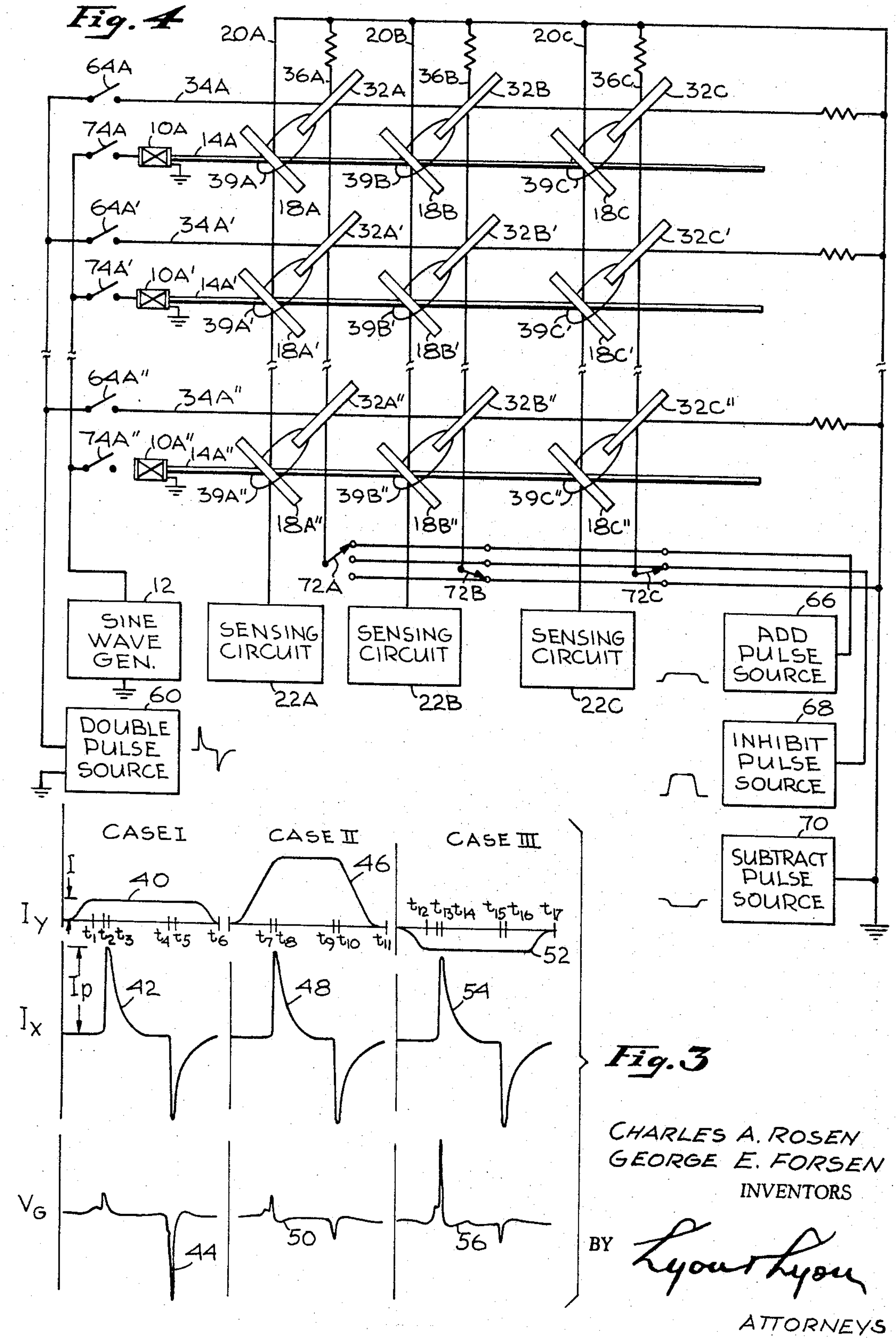
FIGURE 3 is a waveshape drawing shown for the purpose of illustrating a recommended driving pulse program in accordance with this invention.
FIGURE 4 is a circuit diagram illustrating an embodiment of this invention.

FIGURE 3 shows waveshapes which can be applied to the $x$ and $y$ driving lines in a coincident-current driving system to effectuate unilateral flux transfer between a bucket core and storage core. To achieve a drive of a bucket core to induce a positive voltage on the transfer winding, a slow rise time slow-fall, current-controlled, priming pulse having a waveshape such as 40 is initiated in the $y$ drive line first. The amplitude of this pulse is just sufficient to completely switch, if not already in that state, the flux in the bucket core. Because the current magnitude is just over the switching threshold flux is switched slowly giving rise to a small output voltage. Next, a large double pulse 42 which first goes positive and then negative is initiated in the $x$ drive line. Each section of this double pulse has a comparatively fast (approximately 0.1 microsecond) rise time and a slow fall time. The second portion of the waveform 42 has a polarity opposite to that of the priming pulse 40 and switches the material in the reverse direction. Because this pulse has a fast rise time and exceeds the switching threshold by a very large amount it switches the bucket core flux quickly, thereby producing a large output voltage of short duration. This produces a correspondingly large transfer loop current, which can be several times the switching threshold value of the storage core, and also exists for a time sufficiently short to switch only a small portion of the storage core flux.

A waveshape 44 represents the waveshape of voltage which is induced in the transfer loop as a result of the drives applied to the $x$ and $y$ windings as represented by the waveshapes respectively 40 and 42. What has occurred, as far as the bucket core is concerned, is that it is initially slowly brought up to one region of magnetic saturation by the waveshape 40. The first portion of the waveshape 42 serves to drive the core further into saturation and thus as indicated by the first portion of the waveshape 44 only a very small voltage is induced in the transfer winding. The second portion of the waveshape 42 drives the core to saturation in its opposite stage of magnetic remanence; therefore a large output voltage is induced as represented by the waveshape 44.

To inhibit the bucket core from switching flux in the storage core 18 current drives may be applied to the $x$ and $y$ driving windings having the waveshapes respectively 46, 48 which are shown in FIGURE 3. It will be seen that the waveshape 48 is identical with the waveshape 42. The waveshape 46, representative of the current applied to the $y$ driving winding, indicates that a slow-rising and slow-falling large current pulse is applied to the magnetic core prior to the occurrence of the double pulse 48 whereby the core is driven to saturation sufficiently slowly so that a very small voltage as represented by the waveshape 50, is induced in the transfer winding. The second portion of the waveshape 48, while in the opposite direction is still not larger than the peak amplitude of the current applied to the $y$ drive line and therefore has little effect. Also in consequence, not much voltage is induced in the transfer winding as shown by the waveshape 50.

In order to obtain a voltage having the opposite polarity in the transfer winding a slow-rise time, slow-fall time current pulse as represented by the waveshape 52, is applied to the $y$ drive winding. It will be noted that this pulse has the opposite polarity to the current pulse represented by the waveshape 40. The amplitude of this pulse is such as to exceed the switching threshold of the magnetic core, but in view of the slow occurrence thereof, very little voltage is induced in the transfer winding in response to the application of the current pulse to the $y$ drive line. The current pulse-pair applied to the $x$ drive line, as represented by the waveshape 54, is identical with the current pulse-pair represented by the waveshapes 42, 48. It will be seen that the first pulse of the pulse-pair 54 applied to the $x$ drive line operates to drive the bucket core rapidly from the state of remanence to which it was slowly moved by the current applied to the $y$ drive line, to the opposite state of remanence. As a result, as represented by the waveform 56, a large voltage is induced in the transfer loop which has a sharp rise and fall time. The trailing edge of the first pulse of the current pulse-pair 54 applied to the $x$ drive line is sufficiently slow-falling that the pulse 52, which is applied to the $y$ drive line prior to and during the pulse-pair 54, reswitches the bucket core slowly, inducing again very little voltage in the transfer winding. The second pulse of the current pulse-pair 54, tends to switch the bucket core in the same direction as does the priming current pulse 52 producing no net change in flux, and only a small voltage is induced in the transfer winding due to elastic switching and air coupling.

The arrangement for driving the $x$ and $y$ lines is symmetrical in the sense that the drives are interchangeable. The arrangement shows how it is possible to program the application of pulses of the type shown for obtaining or inhibiting a positive or negative unilateral output as desired from the bucket core. An incremental amount of flux is either added to or subtracted from the flux in the storage core in response to the $x$ and $y$ drive.

FIGURE 4 is a circuit diagram exemplifying an arrangement for an embodiment of this invention. This includes a plurality of bucket cores 32A through 32C, 32A′ through 32C′, and 32A″ through 32C″. These bucket cores are represented by the diagonal rectangles. These cores are arranged in rows and columns. There is associated with each bucket core a storage core respectively 18A through 18C, 18A′ through 18C′, and 18A″ through 18C″. The storage cores are similarly disposed in an array proximal to the array of the bucket cores. Each one of the bucket cores is inductively coupled to an associated storage core by a transfer winding respectively 39A through 39C, 39A′ through 39C′, and 38A″ through 39C″. The $x$ drive line 34A is inductively coupled to the bucket cores 32A, 32B, and 32C. The $x$ drive line 34A′ is inductively coupled to the bucket cores 32A′ through 32C′. The $x$ drive line 34A″ is inductively coupled to the bucket cores 32A″ through 32C″.

The $y$ drive line 36A is inductively coupled to the bucket cores 32A through 32A″. The $y$ drive line 36B is inductively coupled to the bucket cores 32B through 32B″. The $y$ drive line 36C is inductively coupled to the bucket cores 32C through 32C″. Each one of the storage cores 18A through 18C is mounted on a delay line 14A in the manner shown in FIGURE 2. Each one of the cores 18A′ through 18C′ is mounted on the delay line 14A′ in the manner previously described. Each one of the cores 18A″ through 18C″ is mounted on the delay line 14A″ in the manner previously described. The respective electro-mechanical transducer 10A, 10A′, and 10A″ are attached to one end of the respective sonic delay lines 14A through 14A″ for applying a compressive drive thereto.

A readout winding 20A is inductively coupled to all of the storage cores respectively 18A, 18A′, and 18A″, and is connected to a sensing circuit 22A. A readout winding 20B is inductively coupled to all of the storage cores 18B, 18B′ and 18B″ and is connected to a sensing circuit 22B. A readout winding 20C is inductively coupled to all the storage cores 18C, 18C′ and 18C″ and is connected to the sensing circuit 22C.

The identicalness of the structure shown and described thus far in FIGURE 4, with that shown in FIGURES 1 and 2 should be appreciated both from the previous description and the nomenclature which has been employed herein. The bucket and storage cores have been disposed in a rectangular array with their associated drive, transfer and readout windings. An addressing system for the bucket cores, or one which can apply driving pulses of the kind whose waveshapes are represented by FIGURE 3, is represented by switches 72A, 72B, 72C, in FIGURE 4. It will be understood that these are representative only, their electronic equivalents are well known. Thus, a double pulse source 60 of the type which can provide the waveshapes represented by 42, 48 and 54 in FIGURE 3 can be selectively connected by means of operation of any one of the switches respectively 64A, 64A′ or 64A″ for applying a double pulse of current to a predetermined one of the $x$ lines 34A, 34A′ and 34A″. Three pulse sources respectively 66, 68 and 70 which are respectively called the add pulse source, the inhibit pulse source and the subtract pulse source, are provided for furnishing current pulses of the type represented by the waveshapes 40, 46, and 52 in FIGURE 3. Three switches respectively 72A, 72B and 72C are employed for selecting the one of the pulse sources 66, 68, 70 required for the storage operation to be performed. The switch 72A connects the selected pulse source to the $y$ drive line 36A. The switch 72B connects the selected pulse source to the drive line 36B, and a itch 72C connects the selected pulse source to the drive e 36C. Any suitable means may be employed for strob- the double pulse source 60 and the selected one of the uble pulse source 70 to achieve the required coincident citation of the $x$ and $y$ drive lines for effectuating an dition of flux in a storage core connected to the driven e of the bucket cores, a subtraction of flux in a storage re or an inhibiting of the bucket core.

The bucket core which is to be driven and thereby the orage core in which the storage operation is to take place selected by selecting the $x$ and $y$ drive windings which tersect at the bucket core. Such selection, as previously dicated is achieved by operating the one of the switches A through 64A″ and 72A through 72C which connect the $x$ and $y$ drive windings which intersect at the desired icket core.

Either phase of the output of a sine wave generator 12 connected to a line, which may be selectively connected actuation of one of the switches, 74A, 74A′ or 74A″ to e of the electro-mechanical transducers 10A, 10A′ or A″. Thereby a readout, of either phase, as desired hich is non-destructive, is obtained from all of the stor- e cores which are mounted on the delay line being riven.

The foregoing description of the write-in drive of the emory system has been on the basis of an individual lection of a bucket core and its drive to one or the other ate of remanence in accordance with whether it is de- red to increment or decrement the contents of the asso- iated storage core. It is possible to write into more than ne bucket core at a time however, as will be appreciated om the following explanation of FIGURE 5 which is a ombined schematic and waveshape diagram.

Figure 5:
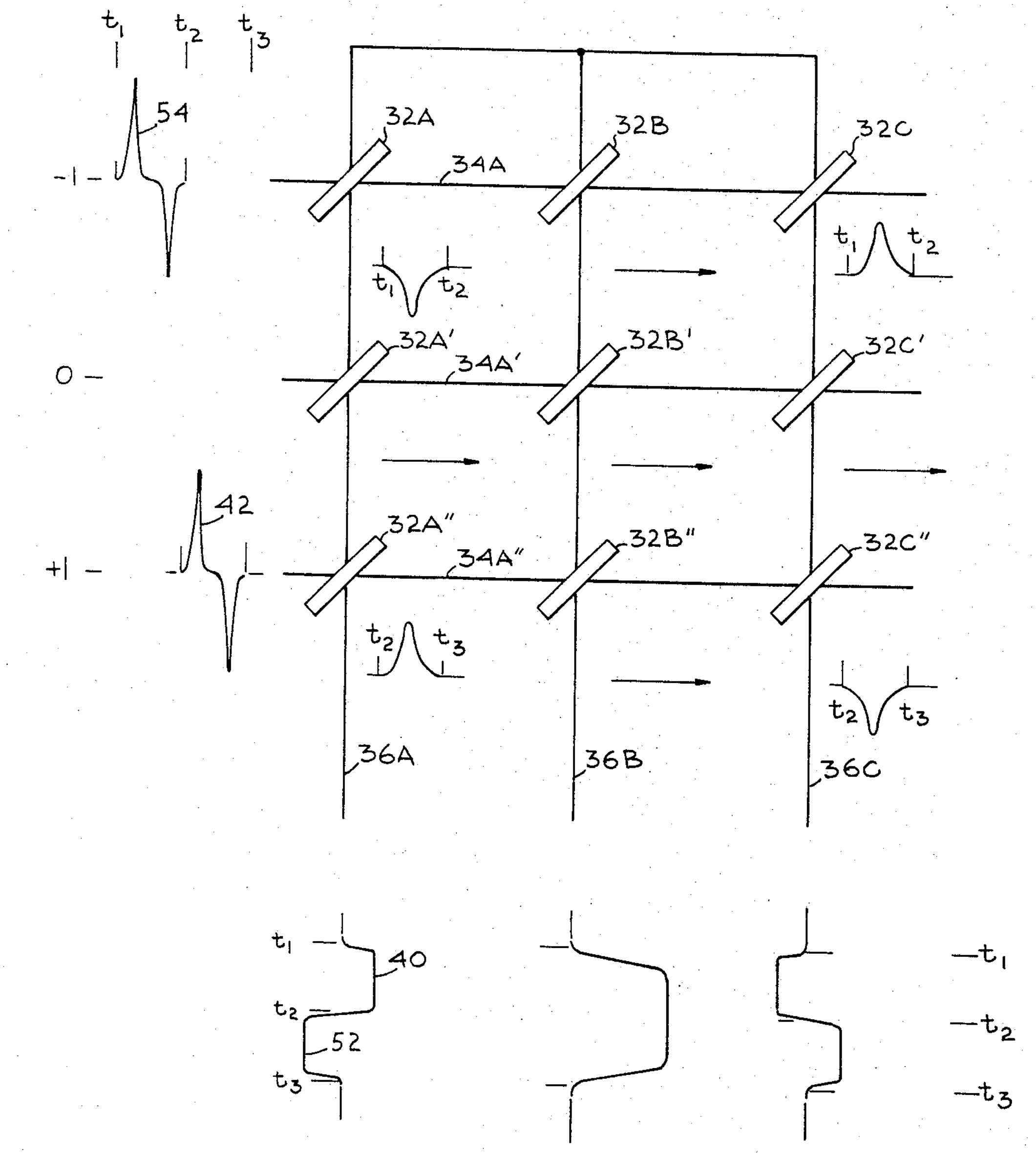
FIGURE 5 is a diagram illustrating an alternative driving scheme for this invention.

FIGURE 5 shows only the bucket cores which were hown in FIGURE 4 and their associated $x$ and $y$ driving nes. Now assume that it is desired to decrement the flux the storage core 18A, associated with bucket core 32A, ave storage core 18A′ associated with bucket core 32A′ naffected, and increment the flux in storage core 18A″ ssociated with core 32A″. A current drive is applied to he line 36A having the waveshape 40 over the interval $_1$—$t_2$ and the waveshape 52 over the interval $t_2$—$t_3$. Thereafter, a current drive having the waveshape 54 is pplied over the interval $t_1$—$t_2$ to the $x$ line 34A and a urrent drive having the waveshape 42 is applied to $x$ line 4A″ over the interval $t_2$—$t_3$.

The result of the foregoing current drives will be to rive core 32A to its negative state of remanence and core 2A″ to its positive state of remanence. To prevent cores 2B and 32B″ from being affected by the drives on their lines, then the inhibit current driving having the wave- hape 46 is applied to the $y$ line 36 over the $t_1$—$t_3$ interval.

If it is also desired to take advantage of the presence of current drives on lines 34A and 34A″ to write into the bucket cores 32C and 32C″ then a current drive can be applied to $y$ line 36C which is the same as is applied to $y$ line 36A, if it is wished to place cores 32C and 32C″ in the states of remanence as the respective cores 32A and 32A″. If it is wished to place cores 32C and 32C″ in states of remanence opposite to those of the respective cores 32A and 32A″ then a current is applied to the $y$ line 36C having a waveform such as 52, over the interval $t_1$—$t_2$ and such as 40 over the interval $t_2$—$t_3$. Then during the interval $t_1$—$t_2$ core 32C is driven to its positive state of remanence and core 32C″ is driven to its negative state of remanence over interval $t_2$—$t_3$. Thus, by the use of some preprograming the number of bucket cores that may be driven within a single interval may be quite large. Of course, by driving the bucket cores to their remanence states, increments of flux are added to or subtracted from the associated storage cores in the manner described previously herein.

It will be appreciated from the foregoing description that an analog storage system is presented which has a large storage capacity. Furthermore, the storage system has the capability of random access for the purpose of storage and also random access for the purpose of readout. In addition, such readout is made non-destructively. The use of magnetic materials for storage purposes has the advantage that barring accidental erasure such storage is permanent and not subject to problems of power supply failures and the like.

We claim:

1. A magnetic storage system comprising a magnetic core made of a magnetic magnetostrictive material, means for altering the amount of magnetic flux in said magnetic core including a second magnetic core, a transfer winding inductively coupling said second magnetic core to said magnetic core, and means for applying magnetomotive forces to said second magnetic core for driving it from one to the other state of magnetic remanence at a first rate to effectuate an alteration of the magnetic flux in said magnetic core and at a second rate to not effect the flux in said magnetic core, said first rate being relatively rapid when compared to said second rate, an output winding inductively coupled to said magnetic core, and means for applying compressional forces to said magnetic core at a predetermined frequency to induce a voltage into said output winding representative of the amount of magnetic flux which is stored in said magnetic core.

2. A magnetic storage system comprising a first storage core made of a magnetostrictive magnetic ferrite material, said first storage core having a central aperture, a readout winding coupled to said core, means for altering magnetic flux in said core in increments comprising a second core, said second core being made of magnetic material having two states of magnetic remanence, means for coupling said second core to said first core for effectuating a flux transfer from said second core to said first core, and means for applying magnetomotive forces to said second core for causing an incremental alteration in the flux in said first core, means for applying radial pressures at a predetermined frequency to said first core including a rod, said rod passing through the central aperture of said core to said rod, and means for applying compressional waves at a predetermined frequency to one end of said rod to induce a voltage in said readout winding representative of the amount and polarity of magnetic flux in said core.

3. A magnetic storage device comprising a plurality of toroidal cores each having a central aperture, each toroidal core being made of a magnetostrictive magnetic ferrite material, each of said toroidal cores having a readout winding inductively coupled thereon, each of said toroidal cores having a separate incremental flux input winding inductively coupled thereon, a sonic delay line comprising a rod passing through the apertures of said plurality of cores, means for mechanically fixing each of said plurality of cores at spaced positions along said rod, means for applying current pulses to a selected one of the input windings of said plurality of cores for altering the amount of magnetic flux in said core by a predetermined increment, and means for applying compressional waves to one end of said rod at a predetermined frequency whereby voltages are induced in each one of the readout windings having an amplitude which is representative of the amount of flux in the core on which the readout winding is mounted.

4. A magnetic storage system as recited in claim 3 wherein said means for selectively applying a current pulse to one of said input windings comprises a second plurality of cores, each one of the cores in said second plurality being associated with one of the cores in said first plurality, a separate output winding on each one of said second plurality of cores, said separate output winding being connected to the input winding of the associated one of said first plurality of cores, each of said second plurality of cores having two states of magnetic remanence, and means for driving a selected one of said cores from one to the other of its states of magnetic remanence to induce a predetermined current in the output winding of said core.

5. A magnetic storage system comprising a first plurality of magnetic magnetostrictive ferrite storage cores disposed in an array of rows and columns, a second plurality of magnetic bucket cores having two states of magnetic remanence, there being a separate bucket core associated with each storage core, said bucket cores being disposed in an array of rows and columns, a transfer winding inductively coupling each bucket core to its associated storage core, a plurality of row windings, each row winding being inductively coupled to all the bucket cores in a different one of the rows of bucket cores, a plurality of column windings, each column winding being inductively coupled to all the bucket cores in a different one of the columns of bucket cores, means for applying current drives to a selected one of said row and column windings to drive the bucket core coupled to said selected row and column windings to a desired state of remanence at a rate to alter the state of flux in the associated storage core, and means for non-destructively sensing the amount of flux in each storage core in a selected row of storage cores.

6. A magnetic storage system as recited in claim 5 wherein said means for non-destructively sensing the amount of flux in a storage core in each row of storage cores includes a separate output winding inductively coupled to each different storage core, a sonic delay line for each row of storage cores, each said sonic delay lin comprising an elongated rod, means for mechanicall affixing each storage core in a row of cores on said ro at spaced points therealong, a separate means for eacl rod for applying compressional forces to one end of sai rod, and means for energizing a selected one of sai means for applying compressional forces, whereby volt ages are induced in the output windings of the storag cores in the row mounted on the rod to which compres sional waves are applied.

References Cited

UNITED STATES PATENTS

| | | | |
|---|---|---|---|
| 2,846,654 | 8/1958 | Epstein | 333—3( |
| 2,984,823 | 5/1961 | Spencer | 340—173 |
| 3,020,416 | 2/1962 | Van Vechten | 340—173 |
| 3,069,664 | 12/1962 | Adams | 340—174 |
| 3,138,789 | 6/1964 | Pugh | 340—174 |
| 3,151,316 | 9/1964 | Bobeck | 340—173 |
| 3,196,413 | 7/1965 | Teig | 340—174 |
| 3,251,044 | 5/1966 | Robinson | 340—174 |

FOREIGN PATENTS

| | | |
|---|---|---|
| 873,367 | 7/1961 | Great Britain. |

BERNARD KONICK, *Primary Examiner.*

M. S. GITTES, *Assistant Examiner.*